Figure 1:
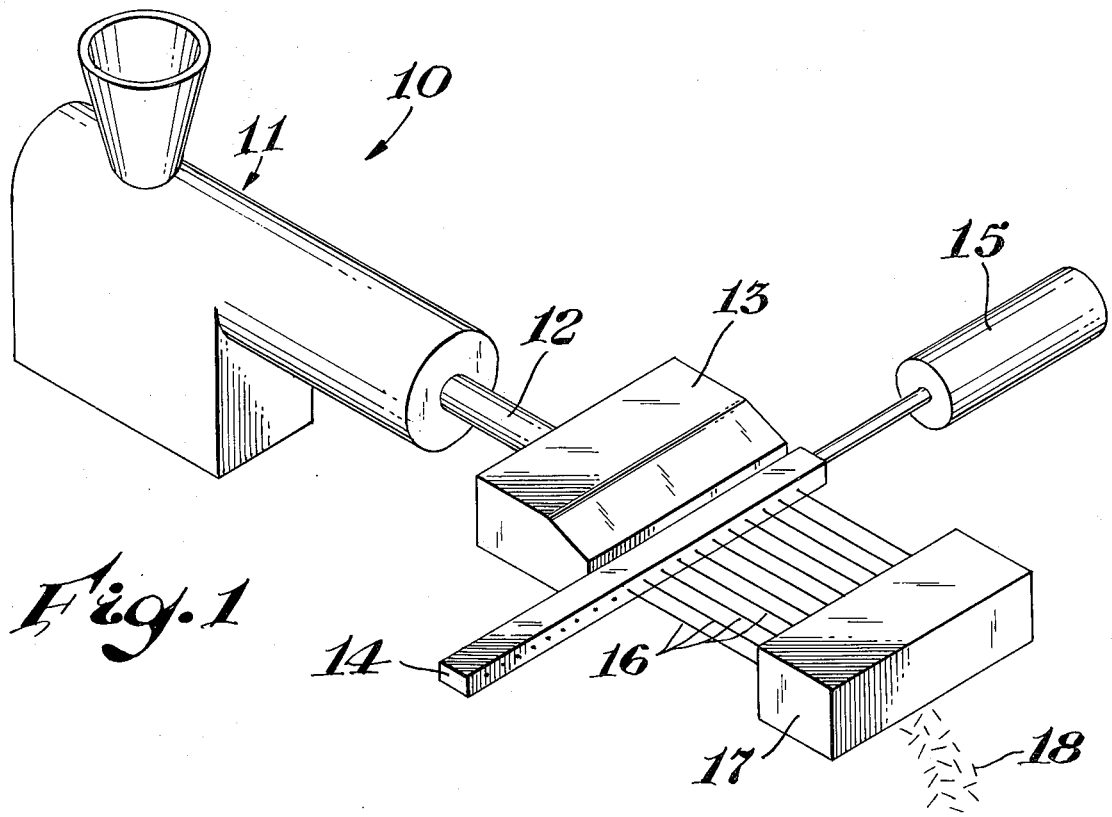

United States Patent [19]
Newman, Jr.

[11] 3,912,439
[45] Oct. 14, 1975

[54] STRAND EXTRUSION APPARATUS
[75] Inventor: Ritchey O. Newman, Jr., Midland, Mich.
[73] Assignee: The Dow Chemical Company, Midland, Mich.
[22] Filed: Nov. 4, 1974
[21] Appl. No.: 520,770

[52] U.S. Cl. ............... 425/308; 425/380; 425/464
[51] Int. Cl.² ................. B29C 17/14; B29F 1/022
[58] Field of Search .......... 425/464, 380, 381, 382, 425/308

[56] References Cited
UNITED STATES PATENTS
3,737,269  6/1973  Grady ......................... 425/464 X
3,762,854  10/1973  Kilsdonk ..................... 425/464 X Primary Examiner—Al Lawrence Smith
Assistant Examiner—J. T. Zatarga
Attorney, Agent, or Firm—Robert B. Ingraham

[57] ABSTRACT

Strands of heat plastified thermoplastic resin are readily prepared employing an extrusion apparatus having a die with a number of openings arranged in a generally linear manner. The die has a die plate having about twice the number of openings required, the die plate is about twice the length of the die. The die may readily be cleaned by sliding the die plate along the die to expose the openings requiring cleaning.

4 Claims, 3 Drawing Figures

U.S. Patent  Oct. 14, 1975  Sheet 1 of 2  3,912,439

STRAND EXTRUSION APPARATUS

In the extrusion of synthetic resinous thermoplastic material into strands, considerable difficulty is often encountered because of undesired matter encountered within or behind the extrusion openings. Oftentimes, such undesirable material is foreign matter in the thermoplastic melt. Sometimes additives or other material, intentionally incorporated in the thermoplastic melt, accumulate on the upstream and sometimes on the downstream side of the extrusion openings and gradually constrict the openings until the desired extrusion configuration is altered. Many remedies have been provided. One particularly popular remedy is to position a so-called screen-pack upstream of the die to provide various foraminous sheets and plates to remove larger foreign particles before such particles reach the die. Such screen-packs or filter elements can become quite complex and various approaches have been devised to permit changing of such filter elements while an extruder is operating. Periodically, an extruder often must be shut down in order to clean accumulated material from the die. This is particularly inconvenient where such an extruder is being employed to convert heat plastified polymer into strands which are then cut into molding pellets. Interruption of an extruder can cause undesired disruption of a polymerization system providing heat plastified polymer to the extruder on a continuous basis.

It would be desirable if there were available an improved simplified extrusion apparatus for the preparation of strands from heat plastified polymer.

It would also be desirable if there were available an improved extrusion apparatus for the preparation of polymer strands wherein the die openings could be readily changed without interrupting extrusion.

It would also be desirable if there were available an improved extrusion apparatus for the preparation of thermoplastic strands which could be readily cleaned and is of simple construction.

These benefits and other advantages in accordance with the present invention are achieved in a polymer extrusion apparatus, the polymer extrusion apparatus comprising a housing, the housing defining an extrusion passageway, the extrusion passageway having an inlet end and an outlet end, the outlet end having an elongate slotlike configuration, a die plate affixed to the housing, the die plate having a plurality of extrusion passages disposed therein, at least a portion of the passages being in communication with the outlet end of the extrusion passageway, the die plate being slidably positioned on the housing so as to selectively position the extrusion orifices in register with the outlet end of the passage and selectively position other extrusion passages remote from the housing where they are accessible for cleaning.

Further features and advantages of the present invention will become more apparent from the following specification taken in connection with the drawing wherein:

In FIG. 1 there is schematically depicted an extrusion apparatus in accordance with the present invention.

Figure 2:
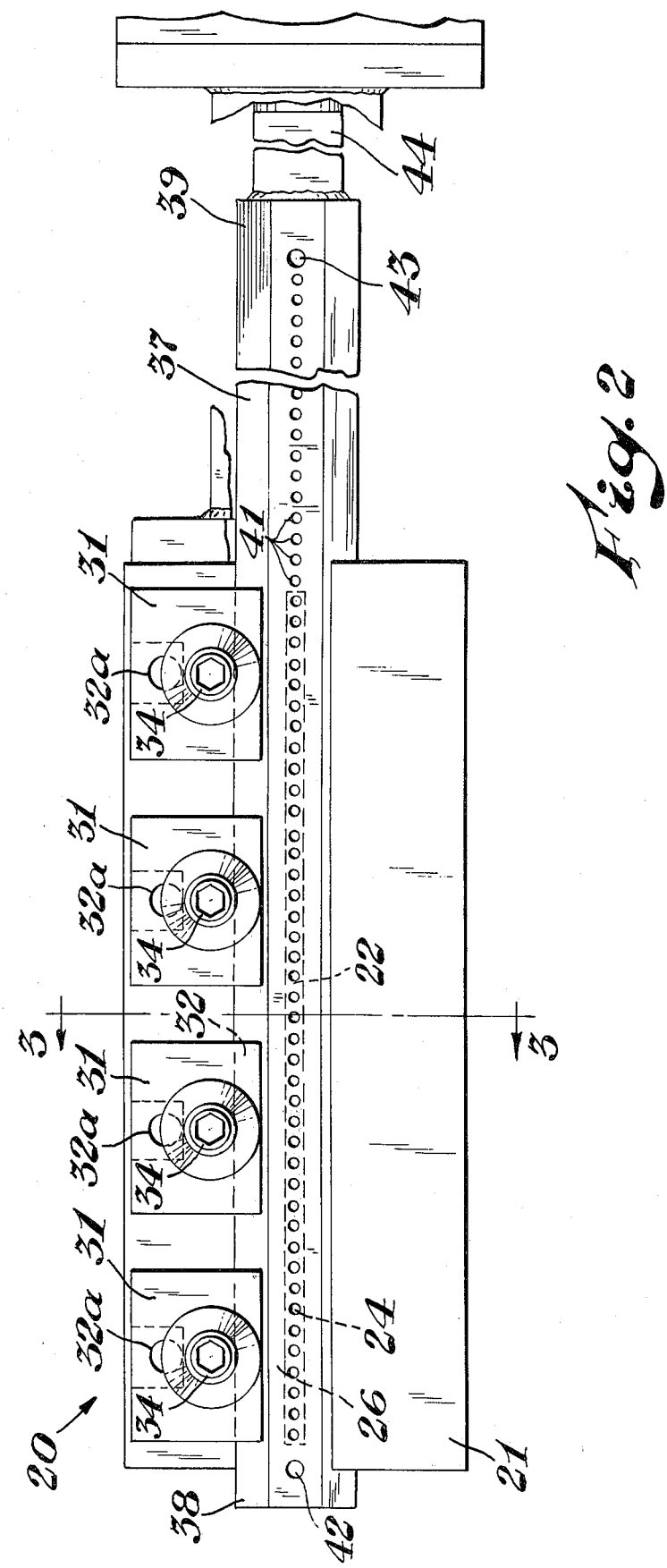

In FIG. 2 there is a front fractional view of an extrusion die in accordance with the present invention.

Figure 3:
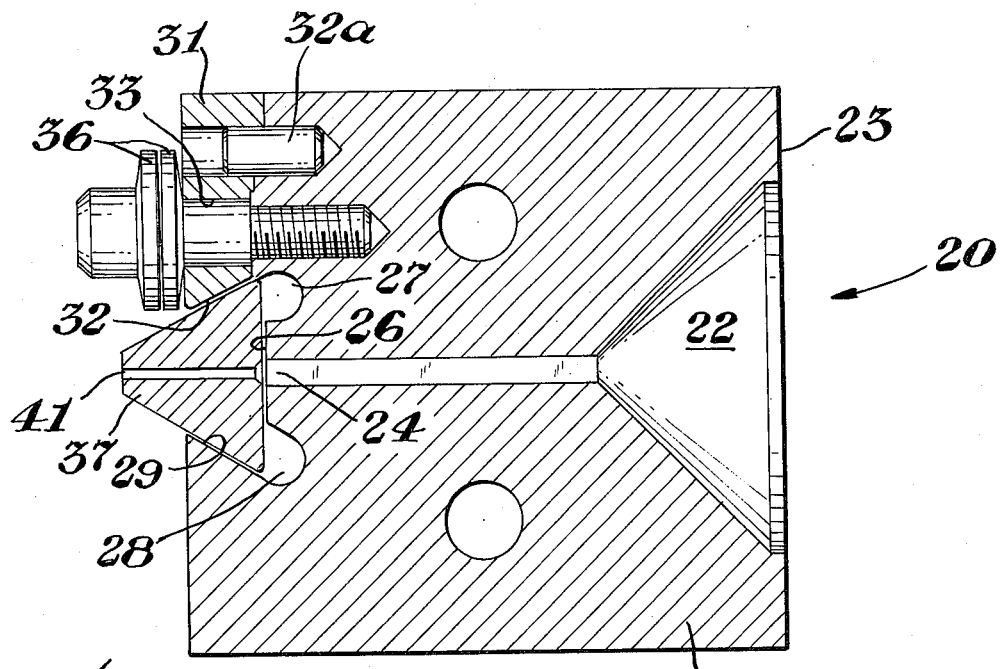

In FIG. 3 is a sectional view of the die of FIG. 2 taken along the line 3—3 thereof.

In FIG. 1 there is schematically depicted an apparatus in accordance with the present invention generally designated by the reference numeral 10. The apparatus 10 comprises in cooperative combination a source of heat plastified synthetic resinous thermoplastic resin or extruder 11. The extruder 11 has a discharge conduit 12 which provides communication with extrusion die 13. The die 13 has an elongate die plate 14 having defined therein a plurality of extrusion orifices, the die plate 14 is slidably affixed to the housing or die body 13. A linear actuator or hydraulic cylinder 15 is attached to the die plate 14 and permits selective positioning of the die plate 14 on the body or housing 13. A plurality of strands 6 of synthetic resinous thermoplastic material are depicted issuing from the die plate 14. The strands 16 are passed to a cutter 17 wherein they are formed into granules 18.

In FIGS. 2 and 3 there is shown a fractional view of a die in accordance with the present invention generally designated by the reference numeral 20. The die 20 is generally equivalent to the die 13 of FIG. 1 and comprises a die body or housing 21 having defined therein an extrusion passageway 22. The passageway 22 has an inlet end 23 and an outlet end 24. The outlet end 24 has an elongated slotlike configuration extending almost the entire width of the housing 21. The housing 21 adjacent the outlet 24 of the extrusion passageway 22 defines an elongate planar bearing surface 26. The surface 26 extends the entire length of the body or housing 21. Immediately adjacent the bearing surface 26 which surround the outlet end 24 are elongate grooves 27 and 28 which extend the entire width of the housing 21. Adjacent the groove 28 the housing 21 defines a generally planar sloping surface 29. The surface 29 extends in a direction parallel to the outlet end 24 and converges towards a center line of the passageway 22 at a location remote from the housing 21. A plurality of retainer plates 31 are affixed to the housing 21 at a location generally adjacent the groove 27 and in spaced relationship to the surface 29. Each of the retainer plates 31 terminates in an inclined clamping face 32. The faces 32 in cooperation with the surfaces 29 and 26 form a generally dovetail slot. Each of the plates 31 is located on the body with a dowel pin 32a disposed in appropriate recesses in plates 31 and the body 21. The plates 31 each defined a bolt receiving opening 33. A bolt 34 threadably engages the body 21. The bolt or cap screw 34 has two cone spring washers 36. By compression of the cone spring washers 36, plates 31 are resiliently tensioned toward the body 21. A die plate 37 is disposed adjacent the outlet end 24 of the passageway 22. The die plate 37 has a cross-sectional configuration which approximates an isosceles trapezoid and the die plate 37 mates with the surfaces 29, 32 and 26. The die plate 37 has a first end 38 and a second end 39. The length of the die plate approximates slightly more than twice the width of the housing 21 and a little greater than twice the length of the outlet end 24 of the extrusion passageway 22. A plurality of strand extrusion openings 41 are formed in the die plate 37 and pass entirely therethrough. The openings 41 provide communication between the extrusion passageway 22 and space external to the die plate 37. A first purge opening or purge extrusion orifice 42 is defined within the first end 38 of the die plate and a second purge orifice or passage 43 defined in the second end of the die plate. The purge openings 42 and 43 are oriented in a manner similar to the extrusion opening 41 but are of substantially greater diameter. A linear actuator 44 is affixed to the second end 39 of the die plate 37.

In operation of the apparatus in accordance with the present invention heat plastified synthetic resinous material is passed into the extrusion passageway 22, discharged from the outlet end 24 of the passageway 22 into extrusion orifices 41 which are immediately adjacent the outlet end 24 and pass from the die plate as strands. When it becomes apparent to the extruder operator that foreign matter is accumulating behind the die plate or within the die plate, the die plate is moved by the linear actuator, for example, to the right, as shown in FIG. 2, until the passage 42 is in communication with the outlet end 24 of the passageway 22. Some material is extruded and if no obvious foreign matter leaves via the purge passage 42, the die plate is moved to the left to provide a clean group of openings 41 adjacent the outlet end 24 of the passageway 22. If desired, initially the second purge passage 43 is positioned for a short period of time in communication with the outlet end 24 of the passageway 22 to remove undesired material which may have accumulated in the adjacent portion of the passageway 22. Generally at least one-half of the openings 41 at any given time are not in communication with the extrusion passageway 22 and are disposed at a location external to the body 21 where they may be cleaned or otherwise cleared of undesired accumulation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A polymer extrusion apparatus, the polymer extrusion apparatus comprising
   a housing, the housing defining
   an extrusion passageway, the extrusion passageway having
   an inlet and
   an outlet end, the outlet end having
   an elongate slotlike configuration,
   a die plate affixed to the housing, the die plate having
   a plurality of extrusion orifices disposed therein, at least a portion of the orifices being in communication with the outlet end of the extrusion passageway, the die plate being slidably positioned on the housing so as to selectively position the extrusion orifices in register with the outlet end of the passageway and selectively position other extrusion orifices remote from the housing where they are accessible for cleaning.

2. The apparatus of claim 1 wherein the die plate has a first end and a second end and at least one purge extrusion orifice disposed at each end of the die plate, the purge extrusion orifices extending generally parallel to the extrusion orifices and having a substantially greater diameter than the extrusion orifices.

3. The apparatus of claim 1 including a linear actuator in operative combination with the die plate, the linear actuator adapted to selectively position the die plate.

4. The apparatus of claim 1 in operative combination with a strand cutter.

* * * * *